July 28, 1959 D. R. POWELL 2,896,330
ROTARY CHECKING FIXTURE
Filed Jan. 23, 1957 2 Sheets-Sheet 1
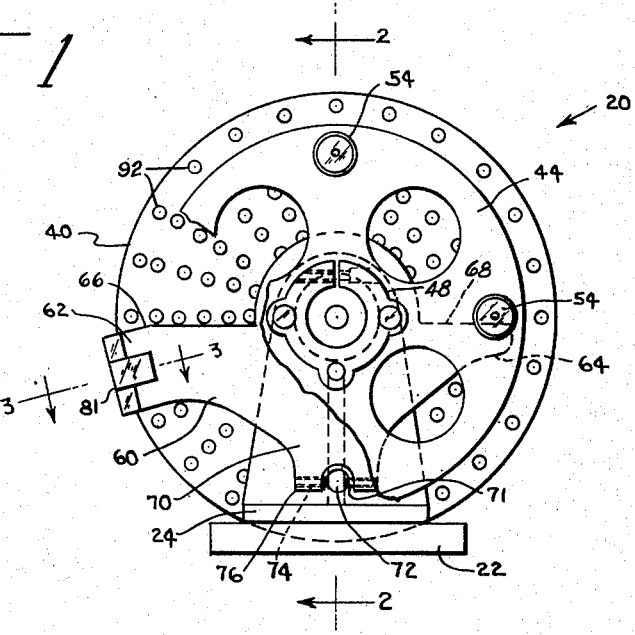
FIG. 1
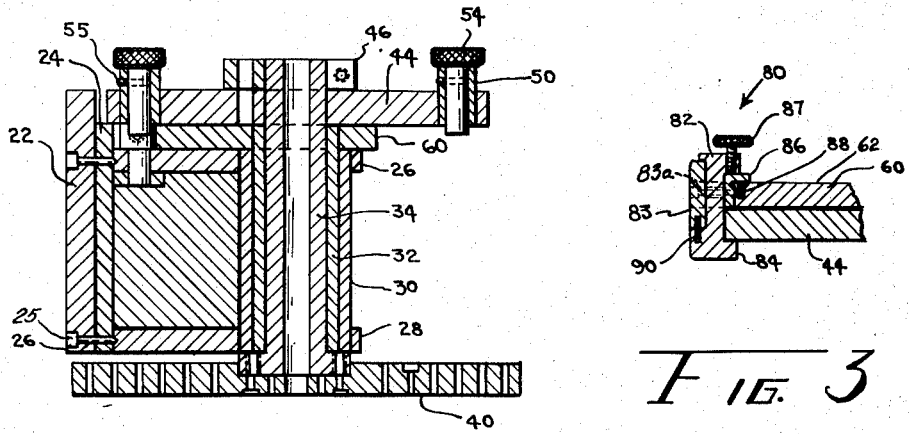
FIG. 2
FIG. 3
INVENTOR.
DANIEL R. POWELL
BY
John L. Woodward
ATTORNEY July 28, 1959 D. R. POWELL 2,896,330
ROTARY CHECKING FIXTURE
Filed Jan. 23, 1957 2 Sheets-Sheet 2

INVENTOR.
DANIEL R. POWELL
BY John L. Woodward
ATTORNEY

United States Patent Office 2,896,330
Patented July 28, 1959

2,896,330

ROTARY CHECKING FIXTURE

Daniel R. Powell, Robbinsdale, Minn.

Application January 23, 1957, Serial No. 635,749

4 Claims. (Cl. 33—174)

This invention relates to a jog board and a rotary checking fixture.

It is an object of this invention to provide in a rotary checking fixture means for obtaining any angle of adjustment for the face or work plate from one second of a degree to 360 degrees.

It is another object of this invention to provide in a rotary checking fixture a novel sine head means cooperating with a sine bar for accurately and quickly obtaining angular adjustments of the face plate.

It is a further object of this invention to provide, in a rotary checking fixture, locking means for securely holding the work plate in its shiftable positions.

Another feature of this invention resides in the simplicity of construction and positive cooperative character of the parts embodied in the fixture.

Other objects and features of the invention will be set forth more fully hereinafter.

The full nature of the invention will be understood from the accompanying drawings and the following description and claims:

Figure 1 is an end view of the fixture, parts broken away, disclosing the sine head, sine bar and the work plate.

Figure 2 is a vertical sectional view of the fixture taken on line 2—2 of Figure 1, disclosing the relative positions of the sine head and sine bar with respect to each other.

Figure 3 is detail sectional view of the locking means for the sine head taken on line 3—3 of Figure 1.

Figure 4:
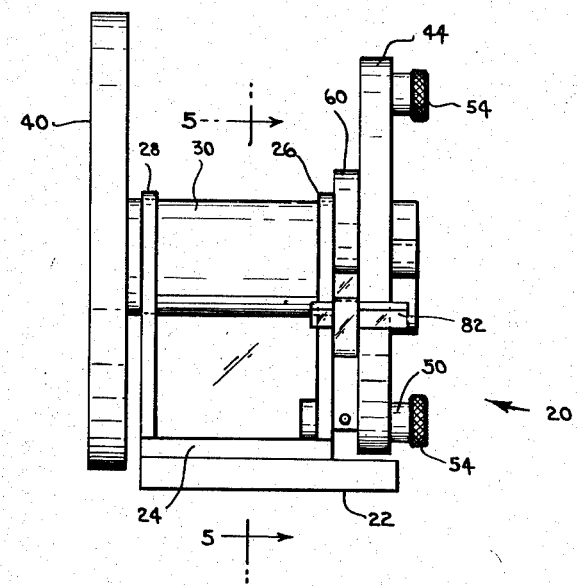
Figure 4 is a view in side elevation of the fixture.
Figure 5:
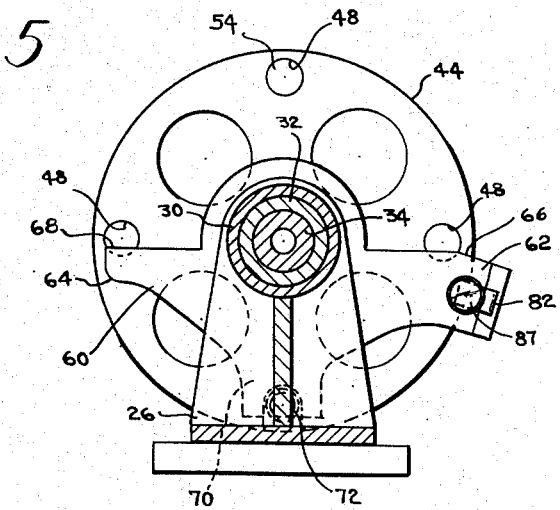
Figure 5 is vertical sectional view taken on line 5—5 of Figure 4 disclosing the structure of the sine block bar.

Referring in detail to the drawings, in Figure 1, 20 is the rotary fixture mounted on a square shaped wear or base plate 22. A second plate 24 is secured by bolts 25 to the wear plate 22. Frame or upright standards 26, 28 are secured to the plate 24.

A hollow cylindrical frame 30 is secured to the standards 26 and 28 inside a relative large opening in the upper portions of each of the standards 26 and 28. A spindle bearing sleeve 32 is secured to the inside of the cylindrical frame 30. A rotary spindle 34 is carried in the sleeve 32 with a portion extending beyond the standards 26 and 28.

A circular-shaped face or work plate 40 is fixedly mounted on one end of the spindle 34.

A circular-shaped sine head 44 is rigidly secured on the opposite end of the rotary spindle 34 by means of a sine head clamp collar 46 on the outer end of the spindle 34. The sine head 44 is provided with four holes 48 adjacent its periphery, each of which is spaced 90 degrees from each other. A bushing 50 is rigidly mounted in each of the holes 48 in the sine head 44. An index pin 54 is slidably mounted in each of the bushings 50. A small pin 55 carried by the pins 54 extends in a slot in the intermediate portion of the bushings 50 to prevent the pins 54 being pulled out of the sine head 44.

A sine block bar 60 having a central circular-shaped portion is provided with an opening which permits the sine bar 60 to be loosely mounted on the sleeve 32. Arm portions 62, 64 extend from the sides of the sine bar 60 and are provided with generally horizontal upper locating surfaces 66 and 68 respectively for a purpose to be set forth hereinafter. A depending portion 70 on the sine block 60 is provided with a notch 71 so that the sine block 60 can be mounted on a rod 72 carried in the lower ends of standards 26, 28 of the fixture 20. A screw 74 is screw threaded in a hole 76 extending through each side of the depending portion 70 into the notch 71 of the sine block 60. The screws 74 upon being adjusted will adjust the position of the sine block 60 relative to the sine head 44.

The portion 62 of the sine block bar 60 is provided with a square shaped notch 81 in its outer end with screw holes in its outer end for aiding in mounting a locking means 80 which is employed for locking the rotary sine head 44 to the stationary sine block bar 60. The locking means 80 comprises an elongated lock bar 82 provided with a lug 84 on both sides at its upper and lower ends. The lock bar 82 is slidably mounted in the notch 81 in the outer end of the arm 62 of the sine bar 60 by means of a lock cover 83 which spans the notch and is secured to the arm 62 by suitable screws 83a. One of the lugs 84 on the lower end of the lock bar 82 is adapted to abut the outer face of the sine head 44 at its outer edge. One of the lugs 84 on the upper end of the lock bar 82 abuts one arm of an angular shaped lock plunger 86 mounted adjacent the outer end of the arm 62 of the sine head 60. One of the angular portions of the lock plunger 86 extends into the notch 81 in the arm 62. A lock screw 87 carried in a threaded hole of the lock bar 82 upon being screwed down pulls the lock bar 82 into tight engagement with the sine head 44 and locks it to the stationary sine bar 60. Springs 88 and 90 mounted in recesses respectively in the sine bar 60 and the lock bar 82 and engaging the plunger bar 86 and lock cover 83 respectively aid in releasing the sine head 44 from locking engagement with the sine bar 60 when the lock screw 87 is unscrewed.

When the lock screw 87 is unscrewed, the rotary sine head 44 can be rotated. The inner end of each of the sine index pins 54 extends beyond the inner face of the sine head 44 when the pin is completely pushed into the sleeve 50 carried in the spaced apart apertures 48 in the sine head 44, and the pins are capable of engaging the surfaces 66 and 68 on the arms 62 and 64 of the sine bar 60 when the sine head 44 is rotated.

A work piece is secured to an angular bar (not shown) which is mounted by bolt means (also not shown) to the front of the face plate 40. The face plate 40 may be provided with any number of screw threaded apertures 92, and it is shown with rows of apertures being 15 degrees apart.

Any of the sine index pins 54 can be made to engage the surface 68 on arm 64 of the sine block bar 60. Then the sine head 44 is rotated counter-clockwise (see Figure 1) and a sine block (not shown) equal to the angular adjustment required of the face plate 40 is placed on the surface 68 of arm 64 of the sine bar 60, and the rotary sine head 44 moved clockwise until the sine index pin 54 being used engages the top of the sine block. Now the lock screw 87 of the locking means 80 is turned or screwed down to lock the sine head 44 to the sine block 60. The locking means 80 will hold the face plate 40 and the work thereon in this shiftable angle until the work is completed on the work piece.

Any angle from one minute to 360 degrees can be obtained by building up the required sine blocks on the surface 68 of arm 64 of the sine bar 60. When the angle adjustments of the face plate are being made, all of sine index pins 54 except the sine index pin being used, are pulled into the sine head 44 so that their inner ends are inside the holes 48 in the sine head 44.

If the sine head 44 has been moved counter-clockwise, see Figure 1, until the sine index pin 54 shown adjacent the surface 68 on arm 64 of the sine bar 60 is 50 degrees from this surface with sine blocks equal to 50 degrees on the surface 68 of arm 64 and an angle of 40 degrees is required for the face plate 40. Then all sine index pins 54 are pulled within the sine head 44 except the sine index pin 54 adjacent the surface 66 on arm 62 of the sine bar 60. The sine head 44 is moved clockwise and a sine block equal to 10 degrees is placed on the surface 66 on arm 62 and the sine index pin 54 being used is engaged with the top of the 10 degree block. Now the lock screw 87 of the locking means 81 is tightened up to lock the face plate 40 in this angular adjustment.

The locating surfaces 66, 68 of the respective arm portions 62, 64 of the sine bar 60 are disposed in a common plane which is parallel to but spaced downwardly from a horizontal plane diametrically intersecting the spindle 34, such downward spacing being by a distance equivalent to the radius of the index pins 54, as is best apparent in Figure 1. When a work object mounted on the face plate 40 requires work to be done 180 degrees apart, then the sine index pin 54 adjacent the surface 68 on arm 64 of the sine bar 60 is moved to engage the surface 68. The three other sine index pins 54 are retracted into the sine head 44 at this time. The locking means 80 is operated to lock the sine head 44 to the sine block 60 when the sine index pin 54 being used is in engagement with the surface 68. After the work on the object has been completed, the locking means 80 releases the sine head 44 from the sine bar 60, and the sine head 44 is rotated either counter-clockwise, 180 degrees, until the same sine index pin 54, which was at the surface 68 on arm 64 of the sine bar 60 is in contact with the surface 66. Then the locking means 80 is actuated to lock the rotary sine head 44 to the sine bar 60 until the work is completed on the work object mounted on the face plate 40.

While the invention has been illustrated and described in great detail in the drawings and foregoing description, the same is to be considered as illustrative and not restrictive in character.

The invention claimed is:

1. In a rotary checking fixture, the combination of a supporting frame including a pair of spaced supporting members and a tubular sleeve extending therebetween, a spindle rotatable in said sleeve and projecting at both ends therefrom, a disc-shaped sine head secured to one end and a work plate secured to the other end of said spindle, for rotation therewith, a sine bar rotatably positioned on said sleeve adjacent said sine head and including a pair of arm portions having locating surfaces disposed in a common plane at opposite sides of said spindle, means for adjusting said sine bar on said sleeve angularly relative to the sine head, means for releasably locking the sine head to said sine bar, and an indexing pin carried by said sine head, said common plane of said locating surfaces of the arm portions of said sine bar being parallel to but spaced away from a plane diametrically intersecting said spindle by a distance equal to one-half the thickness of said indexing pin, whereby said pin may be selectively engaged with said locating surfaces of the sine bar to selectively locate said work plate in two positions spaced 180 degrees apart.

2. The device as defined in claim 1 wherein said pin is projectably and retractably mounted in said sine head and is selectively engageable with said locating surfaces of said sine bar when in its projected positions.

3. The device as defined in claim 1 wherein said means for adjusting said sine bar comprise an abutment element provided on one of said supporting members of said frame, and a pair of opposed adjusting screws carried by said sine bar, said screws being disposed at opposite sides of and engageable with said abutment element.

4. In a rotary checking fixture, the combination of a supporting frame including a pair of spaced supporting members and a tubular sleeve extending therebetween, a spindle rotatable in said sleeve and projecting at both ends therefrom, a disc-shaped sine head secured to one end and a work plate secured to the other end of said spindle for rotation therewith, a sine bar rotatably positioned on said sleeve adjacent said sine head, means for adjusting said sine bar on said sleeve angularly relative to the sine head, means for releasably locking the sine head to said sine bar, and a plurality of indexing pins provided at spaced points on said sine head, said pins being selectively engageable with said sine bar whereby to locate said work plate in a predetermined angular relation to said frame, said means for releasably locking said sine head comprising a pair of coacting clamp members slidably mounted on said sine bar and receiving a marginal edge portion of said sine head therebetween, a clamping screw for sliding said clamp members together whereby to frictionally clamp the sine head, and resilient means for sliding said clamp members apart and out of clamping engagement with the sine head.

References Cited in the file of this patent

UNITED STATES PATENTS

| 1,237,001 | Webber | Aug. 14, 1917 |
| 2,309,142 | Stafford | Jan. 26, 1943 |
| 2,324,476 | Becker | July 20, 1943 |
| 2,343,637 | Bochenck | Mar. 7, 1944 |
| 2,406,043 | Sorensen | Aug. 20, 1946 |
| 2,664,641 | Parnet | Jan. 5, 1954 |

FOREIGN PATENTS

| 606,073 | England | Aug. 5, 1948 |
| 124,702 | Sweden | Apr. 19, 1949 |